United States Patent [19]

Beierle

[11] Patent Number: 4,885,769
[45] Date of Patent: Dec. 5, 1989

[54] STATION CONTROLLER FOR ENHANCED MULTI-LINE PICK-UP IN CENTREX EXCHANGE TELEPHONE SYSTEM

[75] Inventor: John D. Beierle, Danbury, Conn.

[73] Assignee: Nynex Corporation, New York, N.Y.

[21] Appl. No.: 289,905

[22] Filed: Dec. 23, 1988

[51] Int. Cl.[4] .............................................. H04M 3/42
[52] U.S. Cl. .................................... 379/210; 379/214; 379/396
[58] Field of Search ............... 379/201, 210, 211, 212, 379/213, 214, 396, 164, 218; 370/62

[56] References Cited

U.S. PATENT DOCUMENTS 4,665,545  5/1987  Galensky et al. ............... 379/204 X
4,701,950 10/1987  Curtin et al. ........................ 379/214
4,755,985  7/1988  Jayapalan et al. .............. 379/245 X
4,790,004 12/1988  Nalbone .............................. 379/214

Primary Examiner—James L. Dwyer
Attorney, Agent, or Firm—Douglas J. Kirk; John J. Torrente

[57] ABSTRACT

A telephone system employing a centrex exchange having multi-station pick-up groups wherein a station controller means is situated between the exchange and the centrex telephone stations and provides lamp control of the secondary stations of the pick-up groups, and wherein the centrex exchange provides control of the call transfer from the primary stations of the pick-up groups to the respective secondary stations.

30 Claims, 4 Drawing Sheets

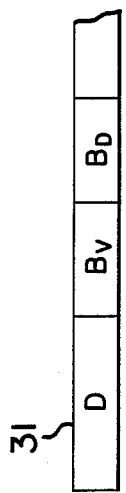
FIG. 3
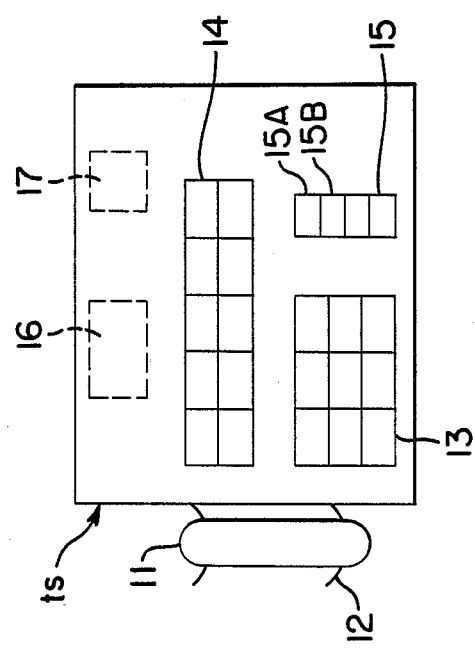
FIG. 2
| PICK-UP GROUPS | | |
|---|---|---|
| | PRIMARY STATION | SECONDARY STATION |
| 1 | $ts_{11}$ | $ts_{12}, ts_{21}, ts_{N1}$ |
| 2 | $ts_{12}$ | $ts_{11}, ts_{21}, ts_{N1}$ |
| 3 | $ts_{21}$ | $ts_{11}, ts_{12}, ts_{N1}$ |
| 4 | $ts_{N1}$ | $ts_{11}, ts_{12}, ts_{21}$ |
FIG. 5

STATION CONTROLLER FOR ENHANCED MULTI-LINE PICK-UP IN CENTREX EXCHANGE TELEPHONE SYSTEM

BACKGROUND OF THE INVENTION

This invention relates to telephone systems and, in particular, to telephone systems which include a centrex telephone exchange having a multi-station pick-up capability for the telephone stations served by the exchange.

In centrex telephone exchanges, the management of telephone calls to and from the telephone stations served by exchange is computer processor controlled and driven. In one form of existing centrex exchange (i.e., the NTI DMS 100), the exchange provides a multi-station pick-up capability. In this type of exchange, the memory of the centrex is provided with a map which defines the other telephone stations of the exchange which can pick-up telephone calls originating at each particular station of the exchange. Each particular station thus defines with these other stations a so-called "multi-station pick-up group".

Hereinafter, when referring to the stations of a multi-station pick-up group, the term "primary station" shall be used to refer to the station whose call can be picked-up and the term "secondary station" shall be used to refer to each station which can pick-up for the primary station. Also, as can be appreciated, any telephone station in the exchange might be a primary station of one pick-up group and a secondary station of one or more other pick-up groups.

When the centrex exchange originates a call at a primary station of a pick-up group, i.e., rings that station, and the primary station does not pick-up, any of the secondary stations in the pick-up group can then pick-up the call. Pick-up is initiated by a secondary station transmitting a pick-up signal to the centrex exchange. This pick-up signal is typically generated by preselected keying at the secondary station.

The centrex exchange receives the pick-up signal and processes the signal via its pick-up group map. In particular, the centrex determines from this map whether the secondary station identified by the pick-up signal is in the pick-up group of the called primary station. If the secondary station is in this pick-up group, the centrex then transfers the call from the called station to the secondary station and the call is then picked up.

In order for the secondary telephone stations in each pick-up group to be aware of the call status at the primary station of the group, each secondary station is provided with a lamp which identifies the primary station and whose state indicates the status of such station. Control of these lamps is through the centrex exchange.

More specifically, the centrex exchange monitors the status of the primary station in each pick-up group, and transmits to the secondary stations in the group lamp control signals which control the states of the lamps of the secondary stations in accordance with the monitored status (e.g., primary station busy--secondary station lamp is controlled to be full on; primary station ringing--secondary station lamp is controlled to be flashing at specified rate; etc.). Since, as above-indicated, any given station in the exchange may be a secondary station in more than one pick-up group, i.e., may be able to pick-up for several primary stations, each station of the exchange may have several lamps which have to be controlled. As a result, to accomodate the required lamping control, the processing load on the centrex is considerable. This tends to reduce the capacity of the exchange.

Also, in this existing type of centrex exchange, the design is such that the lamp control signals are coded (e.g. frequency-shift-key) analog signals. This necessitates the use of special coding equipment at the centrex for each telephone station and has limited use of the system to analog stations.

As can be appreciated, the above-described centrex exchange provides considerable flexibility in being able to establish and vary the multi-station pick-up groups, since this is readily accomplished simply by changing the pick-up group map in its memory. However, the need for lamping control through the centrex, the requirement for analog coding equipment and the confinement to analog telephone stations has made designers look to alternative types of systems which do not have these constraints.

One alternative type of system which has been designed (e.g., the system developed by David Systems Corporation) makes use of modular station controllers between the telephone stations and the centrex exchange. These station controllers are each assigned a number of stations and each permits digital communication with its assigned stations. Multi-station pick-up is accomplished by providing both lamping and switching control for the pick-up groups at the controllers. Switching equipment is, therefore, needed at each controller to permit a call at a primary station to be switched to a secondary station. Also, in this type of system, additional per station relay equipment is utilized to enable telephone stations not assigned to a controller to be in a pick-up group controlled by that controller.

While the above system reduces the processing constraints on the centrex exchange and allows for use of digital telephone stations, the switching equipment needed in each controller is complex and costly. Furthermore, as the number of stations in the pick-up groups increases, the ability of this type of system to meet these demands becomes more difficult.

It is, therefore, a primary object of the present invention to provide an improved centrex exchange with multi-station pick-up capability.

It is a further object of the present invention to provide a centrex exchange with a versatile multi-station pick-up capability in a way which does not substantially reduce the centrex exchange capacity.

It is a further object of the present invention to provide a modular station controller for a centrex exchange meeting the above objects.

SUMMARY OF THE INVENTION

In accordance with the principles of the present invention, the above and other objectives are realized in a telephone system employing a centrex exchange having multi-station pick-up groups wherein a station controller means is situated between the exchange and the centrex telephone stations and provides control of the lamps of the secondary stations of the pick-up groups, and wherein the centrex exchange provides control of the call transfer from the primary stations of the pick-up groups to the respective secondary stations of the groups. By placing the lamp control in the station controller means and the control of call transfer in the centrex, the centrex capacity is preserved and, at the same time, versatility in assigning pick-up groups is achieved. Furthermore, this is realized without any need for switching equipment at the station controller means. An overall more advantageous system thereby results.

In further accord with the invention, the station controller means comprises a plurality of modular station controllers each of which is assigned a different set of stations. Each station controller unit monitors the status of its stations and reports a change in status to a broadcast system or local area network. The latter provides communication amongst the controllers so that the status of the stations monitored by each controller is made available to that controller as well as to the other controllers in the system. Accordingly, the status of the primary stations of the pick-up groups is now present at each controller so that lamping control can be effected at each controller for each primary station. The secondary stations of each pick-up group can, thus, be at different controllers, adding considerably to the flexibility of the system.

Also, in accord with the invention, each station controller is adapted to provide digital communication between its assigned telephone stations and the controller, and tone or dial pulse control signaling, i.e., so-called POTS (plain old telephone system) signaling of the ring-down loop-start type, between the controller and the centrex. In this way, the telephone stations can be processor controlled digital stations and the centrex need have no special coding equipment for its control signaling.

Further, in accord with the invention, the station controllers are adapted such that predetermined keying operations at the telephone stations will be understood by the controller as control codes for more complex control instructions to the centrex.

BRIEF DESCRIPTION OF THE DRAWINGS

The above and other features and aspects of the present invention will become more apparent upon reading the following detailed description in conjunction with the accompanying drawings, in which:

FIG. 2 illustrates a telephone station of the system of FIG. 1;

FIG. 3 shows a message or packet associated with the telephone station of FIG. 2;

FIG. 5 is a listing of representative multi-station pick-up groups for the system of FIG. 1;

DETAILED DESCRIPTION

Figure 1:
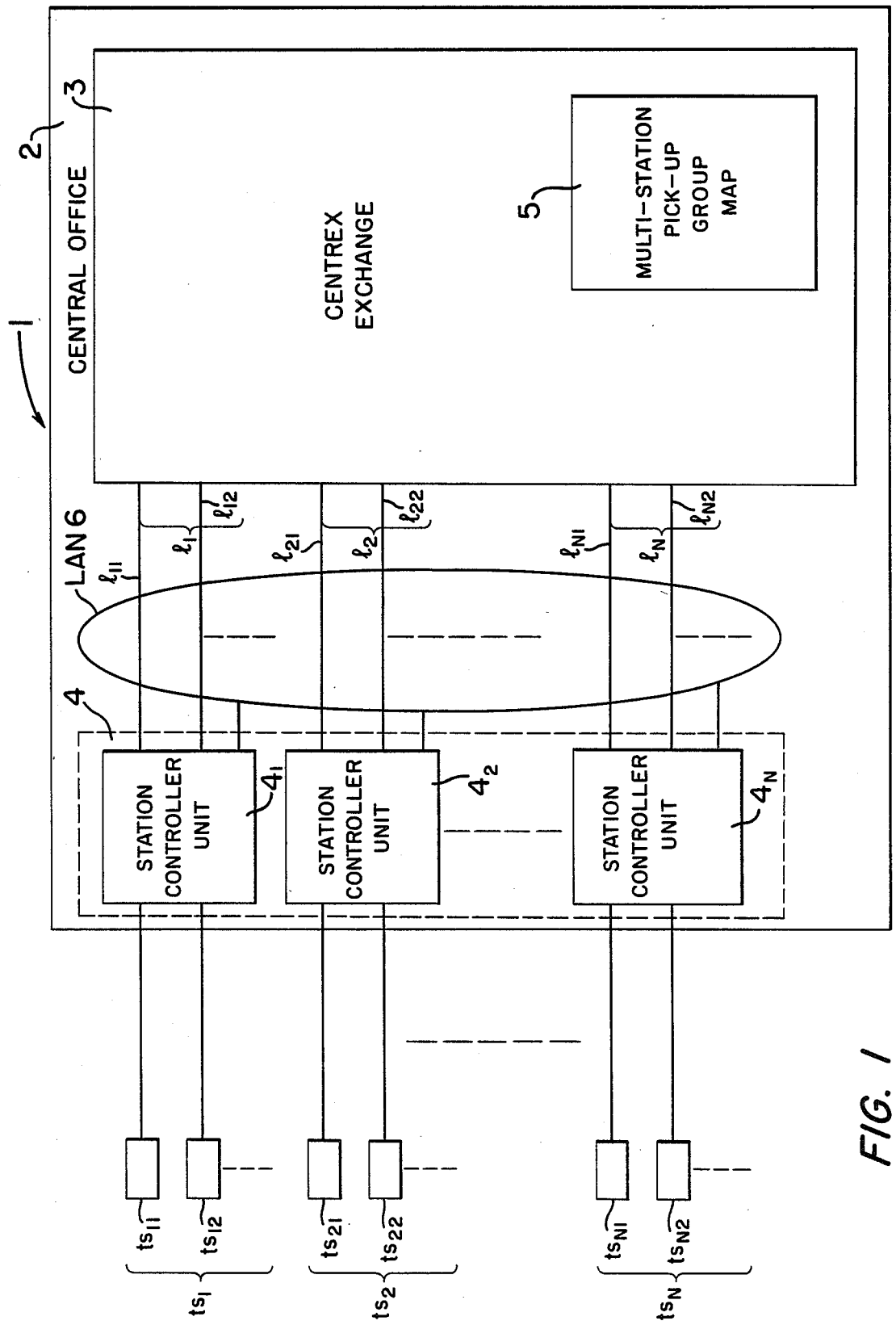
FIG. 1 shows, a telephone system in accordance with the principles of the present invention.

FIG. 1 shows a telephone system 1 in accordance with the principles of the present invention. The system 1 comprises a central office 2 which houses a centrex exchange 3. The latter exchange 3 is an electronic switching system or memory driven exchange. Typical digital centrex exchanges might be AT&T's No. 5 ESS and NTI's DMS 100. Typical centrex analog exchanges might be AT&T's No. 1 ESS and No. 1A ESS.

The centrex exchange 3 manages telephone calls to a plurality of telephone stations ts which are grouped into N groups $ts_1$ to $ts_N$ of n stations $ts_{11}$ to $ts_{1n}$, $ts_{21}$ to $ts_{2n}$ . . . and $ts_{N1}$ to $ts_{Nn}$. For the purposes of the present discussion, each of the telephone stations in the groups $ts_1$ to $ts_N$ is assumed to be a digital station under microprocessor control. Stations of this type are sold by AT&T Technologies under Model No. AT&T ISDN 6504.

FIG. 2, shows a representative station ts. As shown, the station includes a handset 11, a switchook 12, a key pad 13 for dialing, a lamp set 14 for indicating station status, a ringer 17 and a function key set 15 for keying specified functions. These elements all interact with the station microprocessor 16 to provide information flow to and from the station.

Based upon the Integrated Systems Digital Network (ISDN) standard, this flow of information is in terms of message units or packets 31 of the type shown in FIG. 3. As can be seen, each packet 31 includes a D channel (usually 16 Kb/sec) for telephone network control and two B channels (usually 64 Kb/sec), one for voice information Bv and the other for data information $B_D$. The packets 31 are continuously transmitted from and received by the station ts through the microprocessor 16. In the particular case of control information, operation of the switchook and keying of the pad 13 and keys 15 of the station causes the microprocessor 16 to develop D channel digital control information for transmission from the station via the station packets. Conversely, D channel digital control information in a received packet is converted by the microprocessor 16 into signals for actuating the lamp set 14 and the ringer 17 of the station.

The groups of stations $ts_1$ to $ts_N$ are linked to the centrex exchange 3 by corresponding groups of telephone links $1_1$ to $1_N$ comprising links $1_{11}$ to $1_{1n}$, $1_{21}$ to $1_{2n}$ . . . and $1_{N1}$ to $1_{Nn}$. Interposed between the station groups and the centrex at the central office is a station controller 4. The controller 4 includes N modular station controller units $4_1$ to $4_N$ which control the transmission between the respective station groups $ts_1$ to $ts_N$ and the centrex 3.

Figure 4:
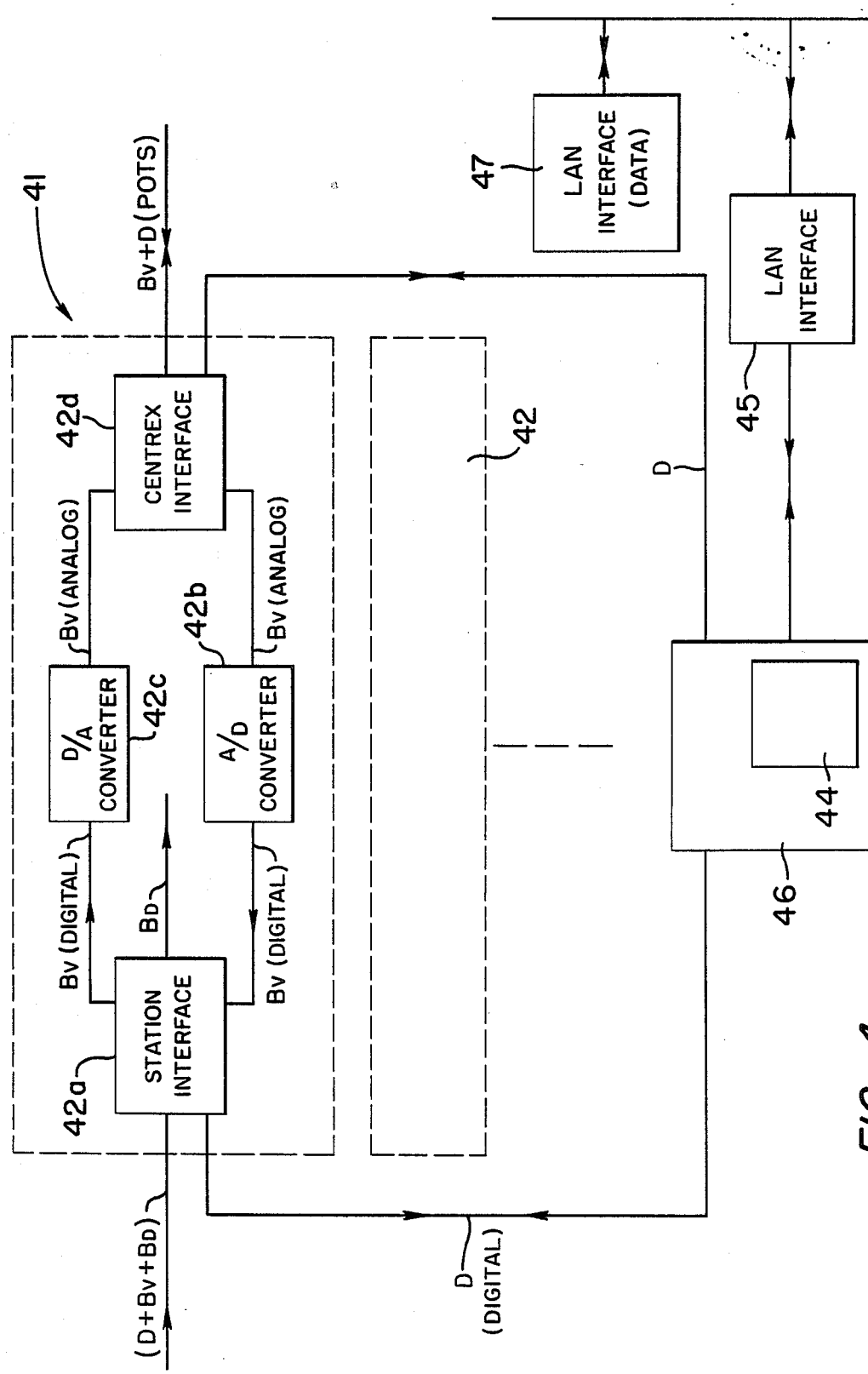
FIG. 4, illustrates the details of a station controller module of the system of FIG. 1.

Each of the station controllers $4_1$ to $4_N$ is also microprocessor controlled. An illustrative station controller 41 is shown in FIG. 4. The controller 41 includes for each of its stations, a controller link 42. Each of the links 42 is of like construction and, as a result, only one link has been actually illustrated. As shown, each link includes a station interface circuit 42a, an A/D converter 42b, a D/A converter 42c and a centrex interface 42d.

The links 42 of the station controller 41 all communicate with a common microprocessor 46. The microprocessor 46 controls the activity of all links 42 and it does so similarly for each link. In particular, the station interface circuit 42a in each controller link 42 receives information packets from the corresponding telephone station and retrieves from each packet the voice, data and control information channels $B_v$, $B_D$ and D. The separated D channel digital control information is then coupled by the interface to the microprocessor 46. The microprocessor 46 converts this information into D channel dial pulse or tone, i.e. POTS, control signals, by control of dial pulse or tone generating circuitry at the centrex interface 42d of the link. The resultant D channel POTS signals are then coupled from the interface 42d to the centrex 3.

The $B_v$ channel digital voice information is also coupled through the interface 42d of the link and delivered to the centrex. This occurs after the $B_v$ channel information is first converted to analog voice information by D/A converter 42c. The $B_D$ channel digital data, in turn, may be treated in a number of ways at the link. Thus, for example, it may be treated similary to the $B_v$ voice channel information by converting it to analog data and then coupling the analog data to the centrex via the interface 42d. It may also be coupled directly to digital channels at the centrex.

Analog information coming from the centrex 3 to a link 42 of a station controller 41 is likewise separated into individual channels at the centrex interface 42d. Thus, the D channel POTS signals, the $B_v$ channel analog voice information and the $B_D$ data (if any) are separated at the interface. The D channel POTS signal is then sensed by the microprocessor 46 which generates corresponding D channel digital control information. The latter, in turn, is combined at the station interface 42a with $B_v$ channel digital voice information, which is developed by A/D converter 42b from the separted $B_v$ channel analog information, and with any $B_D$ channel digital data. The resultant combined channels in packet form are then transmitted to the associated telephone station.

In accordance with the invention, the station controller units $4_1$ to $4_N$ and the centrex 3 are further adapted to allow the system 1 to have one or more multi-station pick-up groups. An illustrative pick-up group might be the stations $ts_{11}$, $ts_{12}$, $ts_{21}$ and $ts_{N1}$, where the primary station of the group is $ts_{11}$ and the secondary stations $ts_{12}$, $ts_{21}$ and $ts_{N1}$. A second pick-up group might be stations $ts_{12}$, $ts_{11}$, $ts_{21}$ and $ts_{N1}$ for the primary station $ts_{12}$. Third and fourth pick-up groups in turn, might be stations $ts_{21}$, $ts_{11}$, $ts_{12}$ and $ts_{N1}$ for the primary station $ts_{21}$ and stations $ts_{N1}$, $ts_{11}$, $ts_{12}$ and $ts_{21}$ for the primary station $ts_{N1}$. In order to simplify the discussion, the description that follows will discuss the invention by reference to the aforesaid pick-up groups, which are illustrated in FIG. 5, although the system 1 may generally have a considerably larger number of such groups.

As can be appreciated from the above, each pick-up group for the system 1 may include secondary telephone stations served by station controller units other than the station controller unit serving the primary station of the group. Thus, for example, the first pick-up group includes secondary stations $ts_{21}$ and $ts_{N1}$ served by controller units $4_2$ and $4_N$, while the primary station $ts_{11}$ is served by the unit $4_1$. This comes about as a result of the unique adaption of the controller units and centrex and allows for an extremely versatile system, as will be explained in greater detail below.

In order to accomodate the aforesaid multi-station pick-up groups in the system 1, the lamp sets 14 of the secondary telephone stations in the groups are used to identify the status of the respective primary stations. In the present case, individual lamps of the lamp set 14 at the station $ts_{11}$ thus identify the status of the stations $ts_{12}$, $ts_{21}$ and $ts_{N1}$. Similarly, individual lamps at the station $ts_{12}$, identify the status of the stations $ts_{11}$, $ts_{21}$ and $ts_{N1}$, individual lamps at the station $ts_{21}$ identify the status of the stations $ts_{11}$, $ts_{12}$ and $ts_{N1}$ and finally individual lamps at the station $ts_{N1}$, identify the status of the stations $ts_{11}$, $ts_{12}$ and $ts_{21}$.

Figure 6:
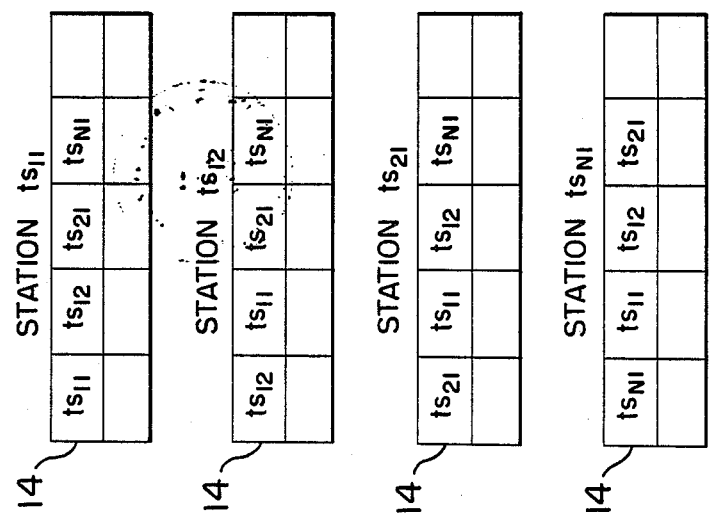
FIG. 6 shows station status indicating lamps of certain of the telephone stations of the system of FIG. 1.

In the depicted situation, the lamp sets 14 of these telephone stations also have individual lamps identifying the status of their own stations. Thus, stations $ts_{11}$, $ts_{12}$, $ts_{21}$ and $ts_{N1}$ have lamps identifying the status of stations $ts_{11}$, $ts_{12}$, $ts_{21}$ and $ts_{N1}$, respectively. The aforesaid identifying lamps for these stations are illustrated in FIG. 6.

In accord with the principles of the invention, the station controller units $4_1$ to $4_N$ are adapted to provide the necessary control for the lamp sets 14 of their respective stations and, in particular, for the aforesaid station identifying status lamps associated with the multi-station pick-up groups. To achieve this, the controllers $4_1$ to $4_N$ each provide lamp control signals to their respective stations. These lamp control signals are generated by the controller processors 46, as will be described in greater detail below, based on the status conditions, e.g., ringing busy, etc., of the stations. Thus, in the system 1, the controller units, and not the centrex exchange 3, generate the lamping control signals for the telephone stations. As a result, the centrex 3 is relieved of this processing requirement and its capacity is preserved.

In order for each controller unit $4_1$ to $4_N$ to be able to control those lamps of its telephone stations which identify the status of primary stations served by other controller units (e.g., for controller $4_1$ to control the lamp $ts_{21}$ of station $ts_{11}$ identifying primary station $ts_{21}$), the status of these primary stations must be reported to the controller. In accord with the invention, a broadcast or local area network (LAN) 6 is provided in the system 1 for this purpose.

The LAN 6 is coupled to each of the controller units $4_1$ to $4_N$ and allows the controllers to communicate with each other. In particular, signals developed by each controller $4_1$ to $4_N$ as to the status of their stations are coupled to the LAN 6 for circulation to each of the other controllers. These status signals are then used by the controllers to develop the lamp control signals for the lamps of their stations associated with the status signals. Accordingly, each controller unit can now control the lamps of its stations which identify the status of primary stations not served by the controller.

As above-indicated, the controller unit $4_1$ to $4_N$ each develop status signals indicative of the status of their respective stations. This is accomplished by the processor 46 of each controller unit recognizing a change status of a station from the D channel control information being fed through the processor from the associated processor link 42. Thus, for example, when the D channel control information from the station $ts_{11}$ indicates the station has gone off-hook, the processor 46 of the controller $4_1$ monitoring the associated link 42 recognizes this status change when it processes the D channel information. Once a processor 46 recognizes a change in status of a station, the processor generates a lamp control signal and a status signal indicative of the status of the station.

The lamp control signal is introduced by the processor 46 back into the digital D channel and transmitted via a packet to the station. The processor 16 at the station then recognizes the lamp control signal as indicative of a change in the status of the station and instructs the lamp indicative of station status to be set to the station condition. In the case of the station $ts_{11}$ going off hook, the lamp $ts_{11}$ would be turned full on.

The status signal generated by the processor 46 is, in turn, coupled to a LAN interface 45 at the controller. The LAN interface 45 then makes the status signal available to the LAN 6. Once a status signal has been placed on the LAN 6, it propagates along the network and is read on-the-fly by each controller unit, via its LAN interface 45. This includes the controller unit which introduced the signal which is the last to read it.

Figure 7:
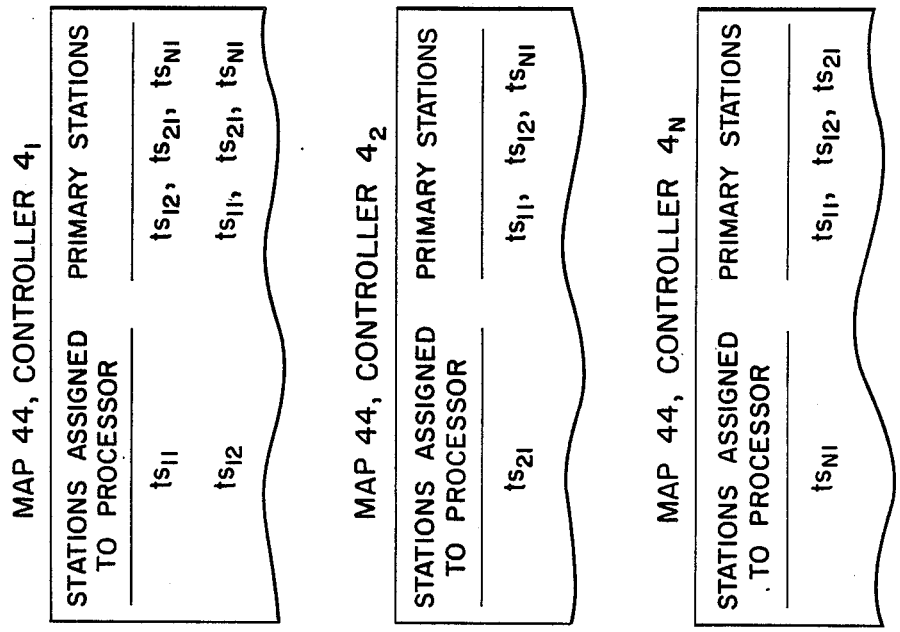
FIG. 7 illustrates parts of correlation maps used in the station controllers of FIG. 1.

The read status signal is then coupled by each interface 45 to its respective processor 46 which then correlates the station identified by the status signal with the telephone stations served by the processor. By this correlation, the processor determines whether the identified station is a primary station for one or more of the processor secondary stations. In the present illustrative case, this correlation is accomplished by providing a map 44 in each processor which permits the processor to correlate the secondary stations served by the processor, i.e., served by the associated controller unit, with their primary stations. Portions of representative maps for the controllers $4_1$, $4_2$ and $4_N$ are shown in FIG. 7.

Having determined the stations which are to receive the status signal, each microprocessor 46 then introduces a lamp control signal into the digital D channel of each of the determined stations for setting the state of the lamp identifying the primary station associated with the status signal. Each D channel with the lamp control signal is then transmitted in packet form via the appropriate link 42 to the associated telephone station. The microprocessor 16 at the associated station then recognizes the lamp control signal in the D channel and causes the state of the corresponding lamp of the lamp set 14 to be suitably set. In this way, the lamps of all the secondary stations corresponding to the status signal and, therefore, the primary station, will have their status appropriately set.

The LAN 6 is preferably a Cambridge ring type LAN which circulates the status signals in a conventional message or packet form and which utilizes source, as opposed to destination, removal of packets. The design of LAN's of this and other types is disclosed in the text Ring Technology Local Area Networks, edited by I. N. Dallas and E. B. Spratt and published by North-Holland in 1984, the teachings of which are incorporated herein by reference.

It should be noted that while the system 1 has been described above as including a correlation map 44 in each of the station controller units $4_1$ to $4_N$, the correlation data can instead be consolidated into a fewer number of maps (e.g. two maps) located at one or more of the controller units. In such case, the maps would contain a consolidated listing of the primary stations, the corresponding secondary stations and lamps and controller units serving these secondary stations.

The status signals from the controller units would then be sent over the LAN 6 to the controllers having these maps for correlation. Having performed this correlation, the processors at such controllers would then send on the LAN 6 individual status signals having controller, station and lamp identifiers. A controller identified by the status signal would then retrieve the status signal via its LAN interface 44 and the signal would then be processed by the controller processor 46 to provide one or more lamp control signals, as above-described.

As can be appreciated from the above, the design of the station controller units $4_1$ and $4_N$ and of the the LAN 6, in accord with the invention, provides the multi-station pick-up groups of the system 1 with lamp control which allows for considerable flexibility in selecting and changing of the pick-up groups. At the same time, it preserves the capacity of the centrex 3. While this results in a highly advantageous system, the system is further adapted, to have the added advantage of a reduced complexity of the controller units. This reduction in complexity is brought about by not requiring the controller units to perform the transfer or switching of calls from the primary to the secondary stations of the pick-up groups. Instead, in accordance with the invention, such call transfer is effected at the centrex exchange 3, in a similar manner as described above for the existing centrex having a multi-station pick-up capability.

In particular, the centrex 3 is provided with a pick-up group map 5 which correlates the primary and secondary stations of the multi-station pick-up groups. The map 5 also includes the status of these stations as is determined by the centrex from the D channel control information received from the controller links.

Each of the telephone stations $ts_{11}$ to $ts_{Nn}$, in turn, has one of its keys 15A of the key set 15 assigned as, a pick-up key. When depressed, the key 15A causes the microprocessor 16 of the station to place in the D channel of the next transmitted packet, a pick-up signal. The latter signal is coupled through the microprocessor 46 of the associated controller and delivered in the POTS D channel to the centrex. The centrex 3 recognizes the pickup signal and the station generating the signal and processes this information via its pick-up group map 5. Specifically, the centrex correlates whether the station is a secondary station in a pick-up group whose primary station is being rung. If there is a correlation, the centrex 3 then transfers the call from the primary station to the secondary station to complete the pick-up operation.

The system 1 thus utilizes the existing call transfer capabilities of the centrex 3 for transferring calls between the primary and secondary stations of its pick-up groups. As above-indicated, this reduces the complexity of the station controller units 4, to $4_N$, as these units need not switch calls and, as a result, need not include any switching equipment for this purpose. By maintaining call transfer at the centrex 3, but providing lamp control at the station controllers, the system 1 thus achieves complete flexibility of its multi-station pick-up groups, while minimizing the complexity of the controllers and preserving the capacity of the centrex.

An example of operation of the system 1 will now be given. Let it be assumed that the party at the station $ts_{11}$ wishes to make call and goes off-hook. This off-hook condition is recognized by the microprocessor 16 of the station $ts_{11}$ and it places in the D channel of its next packet an off-hook signal. At the controller $4_1$, this off-hook signal in the D channel is coupled to the processor 46 which recognizes the signal as a change in status of the station $t_{11}$ to off-hook or busy. The processor then generates a lamp control signal indicative of a busy condition for the lamp $ts_{11}$ of the station and places this signal into the digial D channel for transmission back to the station via a subsequent packet. At the station $ts_{11}$, the microprocessor 16 recognizes the lamp control signal and causes lamp $ts_{11}$ to be set steady on indicating the busy condition of the station.

At the time of generating the lamp control signal, the processor 46 also generates a status control signal indicative of the busy status of the station $ts_{11}$ which is coupled through its LAN interface 44 to the LAN 6. This status signal is then read by the LAN interfaces 44 of the controller units as it circulates on the LAN. The read signal is then passed to the controller processors 46 which process the signal via their correlation maps 44 to identify the secondary stations and lamps associated with the signal. Lamp control signals are then transmitted, similarly as discussed above, to the identified stations to turn the identified lamps steady on indicating a busy condition. In the present case, the lamps $ts_{11}$ for the stations $ts_{12}$, $ts_{21}$ and $ts_{N1}$ become steady on, indicating a busy condition for the station $ts_{11}$.

After the party at the station $ts_{11}$ goes off-hook, the party then actuates the keys on pad 13 and dials the desired number, which is assumed, for present purposes, to be the number station $ts_{21}$. Each of these key operations is detected by microprocessor 16 which places corresponding dial signals in the digital D channel for packet transmission to the processor 46 of controller $4_1$. The processor 46, in turn, converts each digital dial signal into a POTS signal on the POTS D channel to the centrex. The centrex recognizes the dial signals as identifying station $ts_{12}$ and in response, sends a ringing signal on its POTS D channel to the controller $4_2$ instructing it to ring station $ts_{21}$. The ringing signal is recognized by processor 46 of the controller $4_2$ and the processor places a ringing signal on the digital D channel to station $ts_{21}$. The processor also recognizes the change in status of the station $ts_{21}$ and it additionally places on the digital D channel a lamp control signal indicating a ringing status for the lamp $ts_{11}$ at the station $ts_{21}$. The microprocessor 16 at the station receives these signals in the transmitted packets, and activates ringer 17 and changes the condition of the aforesaid lamp to blinking.

Finally, the processor 46 at controller $4_2$ also generates a status control signal indicating ringing status at the station $ts_{21}$ and this status signal is coupled to the LAN 6. The station controllers then read this status signal from the LAN 6 and their processors, in conjunction with the correlation maps 44, generate lamp control signals for the secondary stations associated with the status signal. In the present case, lamps $ts_{21}$ of stations $ts_{11}$, $ts_{12}$ and $ts_{N1}$ will be changed to blinking.

Assuming there is no one at station $ts_{21}$ to respond to the call, let it be assumed that the party at station $ts_{N1}$ observing the continued blinking of its $ts_{21}$ lamp, decides to pick-up the call and goes off-hook. This condition parallels that of the station $t_{11}$ going off hook and the processor of the controller $4_N$ thus reacts similarly to generate a lamp control signal for the lamp $ts_{N1}$ of the station $ts_{N1}$ and a status signal for LAN 6. These signals, in turn, in the same manner as described for the station $ts_{11}$, result in the lamps $ts_{N1}$ of the stations $ts_{N1}$, $ts_{11}$, $ts_{12}$, $ts_{21}$ being turned steady on indicating a busy condition for the station $ts_{N1}$.

The party at station $ts_{N1}$ having gone off-hook, then depresses the pick-up key 15A to generate a pick-up signal. As above-described, the pick-up signal is coupled to the centrex 3 via the microprocessor 16 of the station and the processor 46 of the controller $4_N$. The centrex, in turn, processes the pick-up signal through its pick-up map 5 and determines that the associated station $ts_{N1}$ is in the pick-up group of the currently ringing station $ts_{21}$.

The centrex 3 then transfers the call to the station $ts_{N1}$ and the call is picked up by the party at this station. The centrex also sends a stop ringing signal on the POTS D channel to the station $ts_{21}$ via the controller $4_2$ and the station $ts_{21}$ turns off its ringer.

Since the station $ts_{N1}$ has picked up the call and remains busy, the state of its lamp $ts_{N1}$ and the lamps $ts_{N1}$ of stations $t_{11}$, $t_{12}$ and $t_{21}$ remains the same i.e., remains full on indicative of a busy condition. The status of station $ts_{21}$ however, has changed from ringing to off. This change in status is recognized by the station controller $4_2$ from an acknowledgement signal sent by the station to the controller acknowledging that its ringer has been turned off. The processor 46 responds to the acknowledgement signal by producing a lamp control signal for the station $ts_{21}$ and a status signal for coupling to the LAN 6. The latter signals, in turn, result in the lamp $ts_{21}$ at the station $ts_{21}$ and the lamps $ts_{21}$ at the stations $ts_{11}$, $ts_{12}$ and $ts_{N1}$ being turned off.

When the parties at stations $ts_{11}$ and $ts_{N1}$ complete their conversation and hang up, the status of stations $ts_{11}$ and $ts_{N1}$ again changes. In the same manner as described above, this results in lamp control signals and status signals from the controllers $4_1$ and $4_N$ turning off the lamps $ts_{11}$ and $ts_{N1}$ in all the stations.

In accordance with a further aspect of the present invention, the stations of the system 1 and the controllers $4_1$ to $4_N$ are further adapted such that keying of a single function key, e.g., key 15B of a key set 15 results in complex instruction to the centrex 3. This is accomplished by adapting each microprocessor 46 to interpret the D channel signal resulting from the key 15B operation as requiring control of the centrex interface $42d$ so as to generate D channel POTS signals which result in a plurality of events being carried out at the centrex. Thus, for example, activation of the key 15B might result in a signal at the microprocessor 46 controller unit which is understood by the microprocessor as requiring dialing of a particular number. The processor 46 would then control the centrex interface $42d$ so that control signals would be sequentially placed in the POTS D channel to dial the entire number. As a result, with the actuation of a one or more function keys at a station complex events normally requiring additional keying operations could be made to occur at the centrex.

It should also be noted that the system 1 can be further adapted to permit data from the digital data channel $B_D$ of each station to also be circulated on the LAN 6. Thus, by providing a data interface 47 at each controller, data on the $B_D$ channels of the links 42 of the controller can be coupled to and from the LAN 6. In this way, data can be transferred amongst the controllers $4_1$ to $4_N$ and, as a result, made accessible to all stations in the system 1.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:
1. A telephone system comprising:
   a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group;
   a centrex exchange for managing the flow of telephone calls to and from said telephone stations, said centrex exchange being responsive to the pick- up signal generated by each secondary station of a pick-up group and including means for transferring a call from a primary station in a pick-up group to a secondary station in the pick-up group in response to a pick-up signal from the secondary station;

and station controller means interposed between said telephone stations and said centrex exchange, said station controller means monitoring the status of the primary station of each pick-up group and generating a signal for controlling the state of the lamp means in each of the secondary stations of the pick-up group in dependence on the monitored status of the primary station of the pick-up group.

2. A telephone system in accordance with claim 1 wherein:
said station controller means couples the pick-up signal generated by each secondary station to said centrex exchange.

3. A telephone system in accordance with claim 1 wherein:
each primary station includes a lamp means for indicating the status of that primary station;
and said station controller means generates a signal for controlling the state the lamp means in each primary station in dependence on the monitored status of the primary station.

4. A telephone system in accordance with claim 1 wherein:
said station controller means includes a plurality of station controller units each of which being associated with a number of said telephone stations, each station controller unit monitoring the status of each primary station included in its associated stations and each generating a signal for controlling the lamp means of each secondary station included in its associated stations of a pick-up group in dependence on the monitored status of the primary station of the pick-up group;
and said system further comprises: local area network means for permitting communication amongst said controller units.

5. A telephone system in accordance with claim 4 wherein:
the telephone stations in one or more of said pick-up groups are associated with a plurality of different station controller units;
each station controller unit places on the local area network the status signal of each primary station of its associated stations which is in a pick-up group having one or more secondary stations not included in the associated stations of the controller unit;
and each station controller unit is responsive to each status signal on the local area network which corresponds to a primary station of a multi-station pick-up group having one or more secondary stations included in the associated stations of the controller unit.

6. A telephone system in accordance with claim 5 wherein:
each station controller unit places on the local area network the status signal of each primary station included in its associated stations.

7. A telephone system in accordance with claim 5 wherein:
each station controller unit couples the pick-up signal generated by each secondary station included in its associated stations to the centrex exchange.

8. A telephone system in accordance with claim 7 wherein:
each primary station includes a lamp means for indicating the status of the primary station;
and each station controller unit generates a signal for controlling the state of the lamp means of each primary station included in its associated stations in dependence on the monitored status of the primary station.

9. A telephone system in accordance with claim 4 wherein:
each station controller unit couples voice channel and control channel information between the telephone stations included in its associated stations and the centrex exchange.

10. A telephone system in accordance with claim 9 wherein:
the voice channel and control channel information transmitted between each controller unit and its associated telephone stations is in digital message form and the voice channel and control channel information transmitted between each controller unit and the centrex exchange is in POTS signal form.

11. A telephone system in accordance with claim 9 wherein:
each station controller unit in response to control channel information generated by actuation of one or more keys at a telephone station included in its associated stations, transmits control channel information to said centrex instructing said centrex to carry out multiple operations which would otherwise normally be carried out as a result of greater than said one or more key operations at said station.

12. A telephone system in accordance with claim 4 wherein:
each station controller unit couples data channel information to and from one or more of the telephone stations included in its associated stations;
and each station controller unit couples data channel information to and from the local area network.

13. A station controller for use in a telephone system, the telephone system comprising: a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group; and a centrex exchange for managing the flow of telephone calls to and from said telephone stations, said centrex exchange being responsive to the pick-up signal generated by each secondary station of a pick-up group and including means for transferring a call from a primary station in a pick-up group to a secondary station in the pick-up group in response to a pick-up signal from the secondary station; the station controller being adapted to be interposed between associated ones of the telephone stations and said centrex and excluding means for transferring calls between its associated stations, the station controller including:

means for monitoring the status of each primary station included in the associated stations and generating a status signal;

and means for generating a signal for controlling the state of the lamp means in each secondary station included in the associated stations in dependence on the status of the primary station in the pick-up group of the secondary station.

14. A station controller in accordance with claim 13 further comprising:

means responsive to a local area network circulating signals indicative of the status of one or more of said primary stations.

15. A station controller in accordance with claim 13 wherein:

one or more secondary stations in said associated stations are in a pick-up group having a primary station exclusive of the primary stations included in said associated stations.

16. A method of operating a telephone system comprising:

providing a plurality of a telephone stations including: arranging the stations into one or more multi-station pick-up groups, each pick-up group having a primary station and one or more associated secondary stations for picking-up calls to the primary station; and providing each secondary station of a pick-up group with lamp means for indicating the status of the primary station of the pick-up group and with means for generating a pick-up signal for initiating the pick-up of a call to the primary station of the pick-up group;

managing the flow of telephone calls to and from said telephone stations with a centrex exchange, said centrex exchange being responsive to the pick-up signal generated by each secondary station of a pick-up group and transferring a call from a primary station in a pick-up group to a secondary station in the pick-up group in response to a pick-up signal from the secondary station;

and interposing a station controller means between said telephone stations and said centrex exchange, said station controller means monitoring the status of the primary station of each pick-up group and generating a signal for controlling the state of the lamp means in each of the secondary stations of the pick-up group in dependence on the monitored status of the primary station of the pick-up group.

17. A method of operating a telephone system in accordance with claim 16 wherein:

said station controller means couples the pick-up signal generated by each secondary station to said centrex exchange.

18. A method of operating a telephone system in accordance with claim 16 wherein:

each primary station includes a lamp means for indicating the status of that primary station;

and said station controller means generates a signal for controlling the state the lamp means in each primary station in dependence on the monitored status of the primary station.

19. A method of operating a telephone system in accordance with claim 16 wherein:

said step of interposing said station controller means includes: providing a plurality of station controller units; associating each station controller unit with a number of said telephone stations so that each station controller unit monitors the status of each primary station included in its associated stations and each generates a signal for controlling the lamp means of each secondary station included in its associated stations of a pick-up group in dependence on the monitored status of the primary station of the pick-up group;

and said method further comprises: providing local area network means for permitting communication amongst said controller units.

20. A method of operating a telephone system in accordance with claim 19 wherein:

the telephone stations in one or more of said pick-up groups are associated with a plurality of different station controller units;

each station controller unit places on the local area network the status signal of each primary station of its associated stations which is in a pick-up group having one or more secondary stations not included in the associated stations of the controller unit;

and each station controller unit is responsive to each status signal on the local area network which corresponds to a primary station of a multi-station pick-up group having one or more secondary stations included in the associated stations of the controller unit.

21. A method of operating a telephone system in accordance with claim 20 wherein:

each station controller unit places on the local area network the status signal of each primary station included in its associated stations.

22. A method of operating a telephone system in accordance with claim 20 wherein:

each station controller unit couples the pick-up signal generated by each secondary station included in its associated stations to the centrex exchange.

23. A telephone system in accordance with claim 22 wherein:

each primary station includes a lamp means for indicating the status of the primary station;

and each station controller unit generates a signal for controlling the state of the lamp means of each primary station included in its associated stations in dependence on the monitored status of the primary station.

24. A method of operating a telephone system in accordance with claim 19 wherein:

each station controller unit couples voice channel and control channel information between the telephone stations included in its associated stations and the centrex exchange.

25. A method of operating a telephone system in accordance with claim 24 wherein:

the voice channel and control channel information transmitted between each controller unit and its associated telephone stations is in digital message form and the voice channel and control channel information transmitted between each controller unit and the centrex exchange is in POTS signal form.

26. A method operating a telephone system in accordance with claim 24 wherein:

each station controller unit in response to control channel information generated by actuation of one or more keys at a telephone station included in its associated stations, transmits control channel information to said centrex instructing said centrex to carry out multiple operations which would otherwise normally be carried out as a result of greater than said one or more key operations at said station.

27. A method of operating a telephone system in accordance with claim 19 wherein:
   each station controller unit couples data channel information to and from one or more of the telephone stations included in its associated stations;
   and each station controller unit couples data channel information to and from the local area network.

28. A method of operating a station controller for use in a telephone system, the telephone system comprising: a plurality of telephone stations including one or more multi-station pick-up groups, each pick-up group having a primary station and one or more associated secondary stations for picking-up calls to the primary station, and each secondary station of a pick-up group including lamp means for indicating the status of the primary station of the pick-up group and means for generating a pick-up signal for initiating the pick-up of a call to the primary station of the pick-up group; and a centrex exchange for managing the flow of telephone calls to and from said telephone stations, said centrex exchange being responsive to the pick-up signal generated by each secondary station of a pick-up group and including means for transferring a call from a primary station in a pick-up group to a secondary station in the pick-up group in response to a pick-up signal from the secondary station; the station controller being adapted to be interposed between associated ones of the telephone stations and said centrex and excluding means for transferring calls between its associated stations, the method of operating said station controller including:
   monitoring with said station controller the status of each primary station included in the associated stations and generating a status signal;
   and generating with said station controller a signal for controlling the state of the lamp means in each secondary station included in the associated stations in dependence on the status of the primary station in the pick-up group of the secondary station.

29. A method of operating a station controller in accordance with claim 28 further comprising:
   responding with said station to a local area network circulating signals indicative of the status of one or more of said primary stations.

30. A method of operating a station controller in accordance with claim 28 wherein:
   one or more secondary stations in said associated stations are in a pick-up group having a primary station exclusive of the primary stations included in said associated stations.

* * * * *